W. O. PHILLIPS.
SLIDE RULE.
APPLICATION FILED DEC. 21, 1912.
1,088,175.
Patented Feb. 24, 1914.
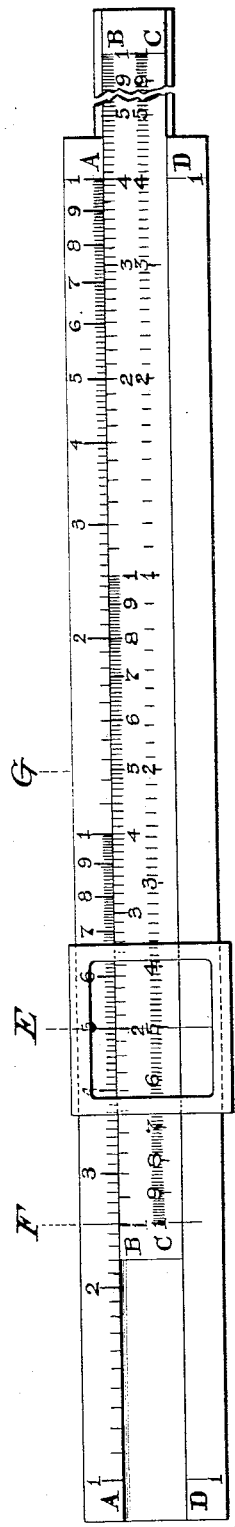
Witnesses:
Edward Rowland
Katharine C. Mead
William Oliver Phillips
Inventor
By his Attorneys
Wilkinson, Witherspoon and MacKaye

UNITED STATES PATENT OFFICE.

WILLIAM OLIVER PHILLIPS, OF RIVERSIDE, ILLINOIS.

SLIDE-RULE.

1,088,175.  Specification of Letters Patent.  Patented Feb. 24, 1914.

Application filed December 21, 1912. Serial No. 737,999.

*To all whom it may concern:*

Be it known that I, WILLIAM OLIVER PHILLIPS, a citizen of the United States, residing at Riverside, in the county of Cook and State of Illinois, have invented certain new and useful Improvements in Slide-Rules; and I do hereby declare the following to be a full, clear, and exact description of the invention, such as will enable others skilled in the art to which it appertains to make and use the same.

The present invention has relation to an improvement in that class of mathematical slide rules wherein a "reciprocal scale" is employed, having the functions and advantages fully set forth in U. S. Patent to Rosenthal, No. 767,170, dated August 9th 1904, engineer's slide rule.

The object of the present invention is to provide an improvement of the Rosenthal slide rule, whereby the scope of operation and consequent value of the rule is increased and the accuracy of the rule improved as hereinafter set forth.

My improved slide rule is illustrated in a preferred form in the accompanying drawing, wherein the same is shown in plan or face view, omitting scales "C" and "D."

The original Mannheim rule is made of the usual body portion having the scales A on one side, comprising two similar logarithmic scales reading from left to right and each occupying one half the length of the rule. On the other side of the body portion, the old Mannheim scale provides a single logarithmic scale D from left to right running the entire length of the rule. Between these a slide carries scales B, identical with and contiguous to scales A, and a scale C identical with and contiguous to scale D. The letters above mentioned are generally used in this art to indicate the various scales mentioned.

In the Rosenthal rule, above mentioned, the same scales are used as are above described, save that the scales B, are half scales running in opposite direction from a middle point. That scale which runs from right to left is called the "reciprocal scale," and, to a limited extent, this arrangement permits the carrying out of certain operations not possible with the old Mannheim rule; as for instance multiplying three numbers in one setting, or position of the slide with respect to the body-dividing one number by two numbers at one setting, etc.

My improvement over the Rosenthal rule consists in combining the same with the Mannheim rule. For this purpose, I provide, in addition to scales C and D—(not shown in the drawing)—the usual scale A on the body, and, on the slide, both the Mannheim and the Rosenthal pairs of scales. One of these pairs of scales is placed in the middle of the slide, and I prefer to place the Rosenthal scales in the middle, as shown in the drawing. Indeed the main advantages of my invention are present, even if the right hand Rosenthal half scale be omitted, and I claim such a construction as a part of my invention, so long as the reciprocal or inverse logarithmic half scale is used.

In the particular form shown in the drawings the Rosenthal half scales are shown in the under part of the slide, by which I mean any part below scales B. The slide is set for multiplication of five times five times five. For this purpose we have only to set the usual runner with its hair line on 5 in the left hand A scale as at E, and to move the slide until 5 on the left hand B scale (reciprocal half scale) comes under the hair line. The product of five and five is then found opposite the left hand index at twenty-five in the A scale, as shown at F.

Now, by looking for 5, as the third factor, in the left hand B scale, it is found at G, pointing to 125, in the right hand A scale—and this is the product of the three factors originally sought. Moreover, without moving the slide, the product of the first two factors (25) multiplied by any number up to forty will be found on the A scale opposite such third factor on one of the B scales.

It is one of the advantages of my improved scale that it will give, in one setting, the product of any three integers when the number of digits in such product is three. The Rosenthal rule will not accomplish this. For instance, in the multiplication above carried out, the five on the right hand B scale of Rosenthal will be found outside of the main body, and beyond both A scales.

Another advantage of my improvement is that the graduation can be accomplished more accurately than with the Rosenthal rule, as the slide does not have to be removed from the body portion of the rule during graduation.

As heretofore indicated, I do not limit myself to the actual arrangement of scales shown in the drawing, so long as the broad description heretofore given is complied with, and the terms of the following claims are followed.

What I claim is—

1. A slide rule comprising the usual body portion and a slide, said body portion being provided with the usual A scales of the Mannheim slide rule, each of half the length of the rule and both reading in the same direction; said slide being provided with two direct reading half length scales substantially identical with the first named scales, and also with a half length scale identical with one of those first named but reading inversely, substantially as described.

2. A slide rule comprising the usual body portion and a slide, said body portion being provided with the usual A scales of the Mannheim slide rule, each of half the length of the rule and both reading in the same direction; said slide being provided with two direct reading half length scales, substantially identical with the first named scales, and placed near the same, and also with a half length scale extending along said slide farther from said first named scales, the same being identical with one of the scales first named but reading inversely, substantially as described.

3. A slide rule comprising the usual body portion and a slide, said body portion being provided with the usual A scales of the Mannheim slide rule, each of half the length of the rule and both reading in the same direction; said slide being provided with two direct reading half length scales, substantially identical with the first named scales, and with two half scales also identical with said first named scales but reading in opposite directions from a middle index, substantially as described.

4. A slide rule comprising the usual body portion and a slide, said body portion being provided with the usual A scales of the Mannheim slide rule, each of half the length of the rule and both reading in the same direction; said slide being provided with two direct reading half length scales substantially identical with the first named scales, and also with two half length scales placed farther away from said first named scales, the same being substantially identical with said first named scales, but reading in opposite directions from a middle index, substantially as described.

In testimony whereof, I affix my signature, in presence of two witnesses.

WILLIAM OLIVER PHILLIPS.

Witnesses:
  GEORGE HENRY WEILER,
  W. E. COOK.